J. A. EDEN, Jr.
TAPPING MACHINE.
APPLICATION FILED MAR. 1, 1916.

1,236,414.

Patented Aug. 14, 1917.
11 SHEETS—SHEET 4.

James A. Eden, Jr.
INVENTOR

BY D. Anthony Usina, ATTORNEY

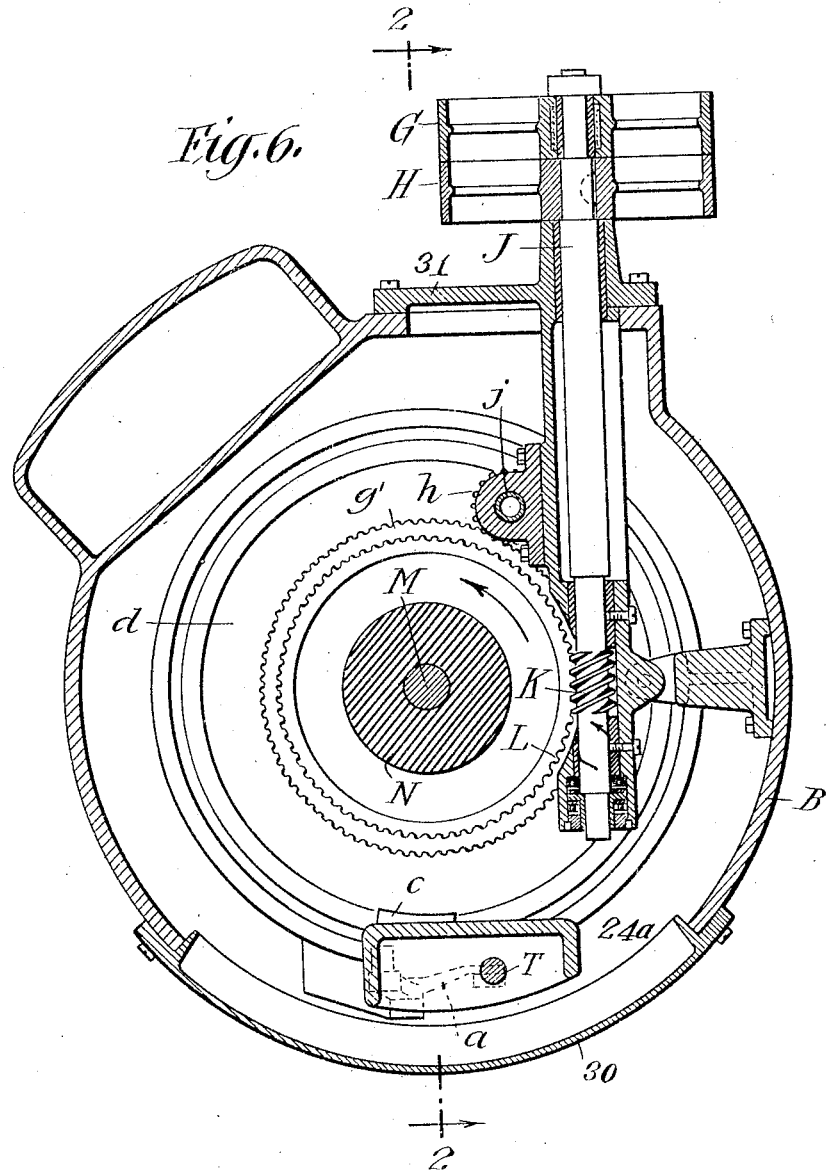

J. A. EDEN, Jr.
TAPPING MACHINE.
APPLICATION FILED MAR. 1, 1916.
1,236,414.
Patented Aug. 14, 1917.
11 SHEETS—SHEET 6.
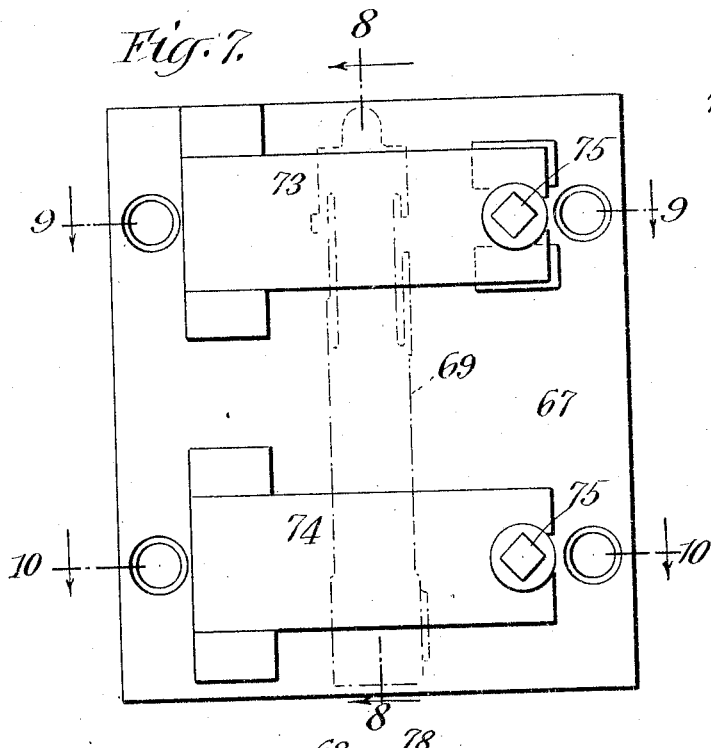
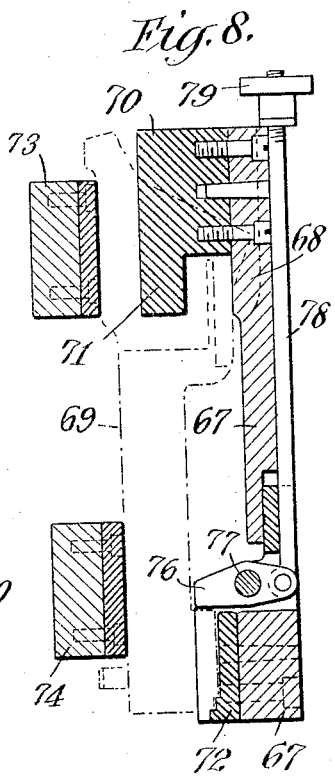
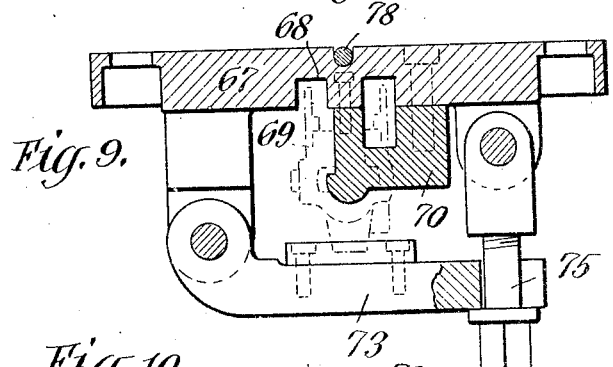
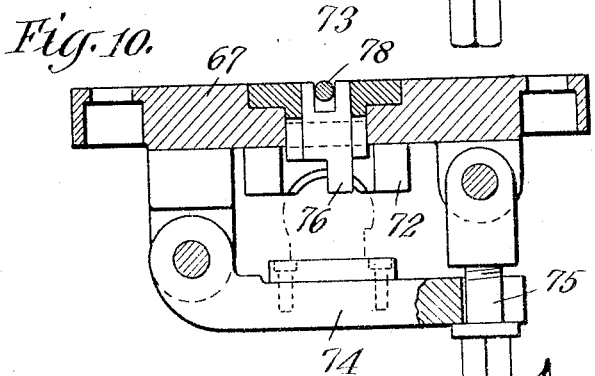
James A. Eden, Jr.
INVENTOR
BY
D. Anthony Usina ATTORNEY

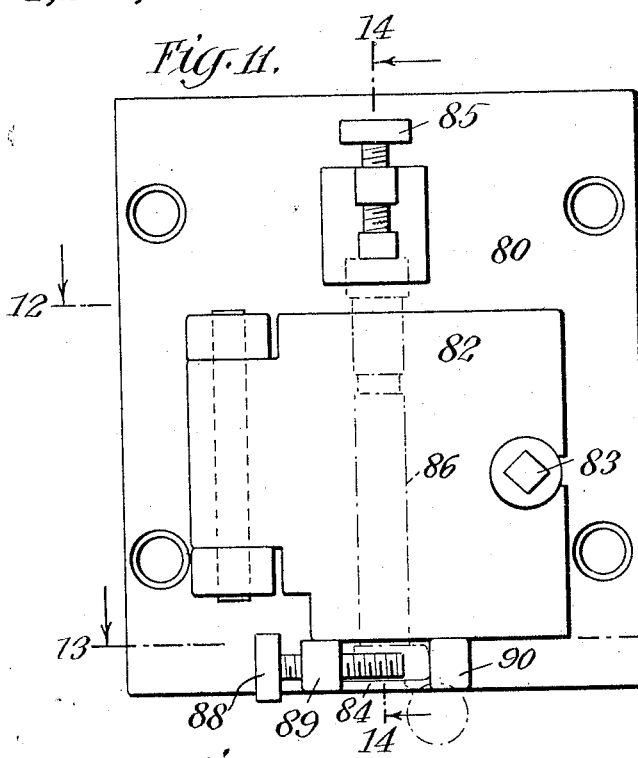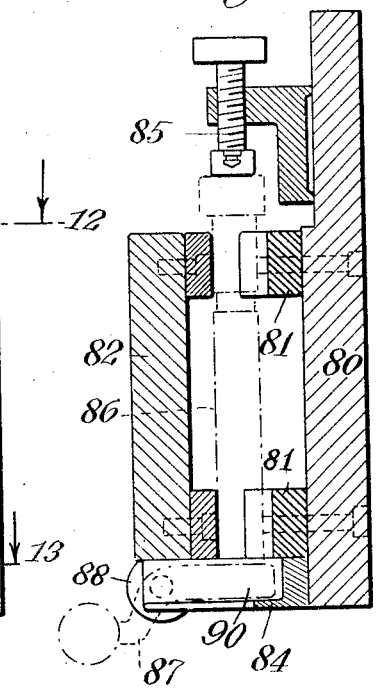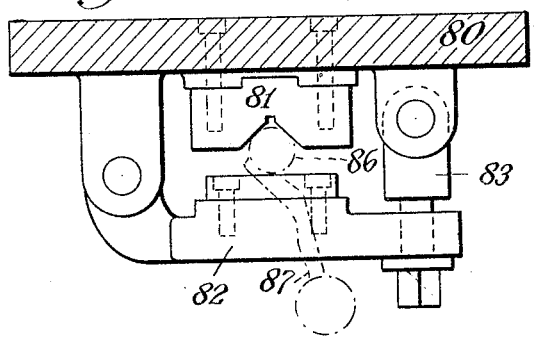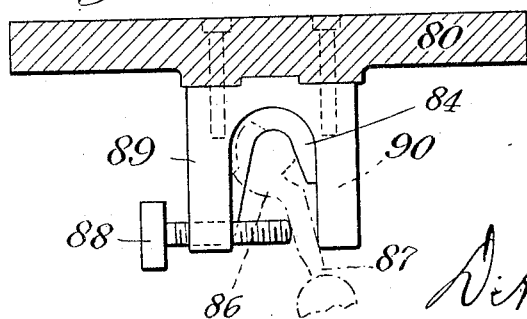

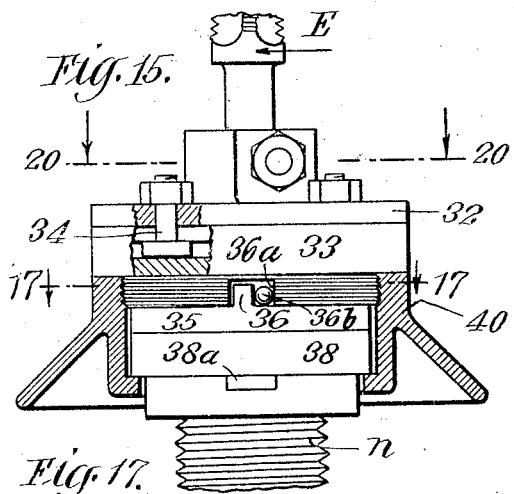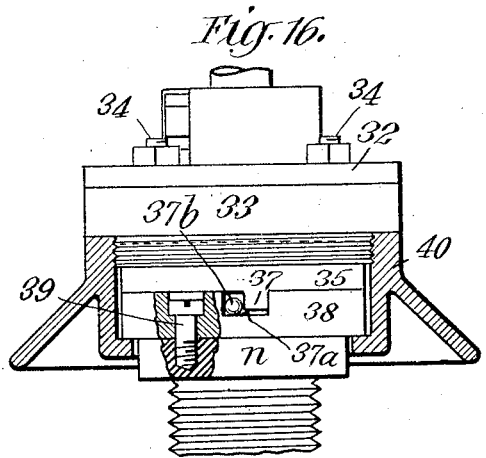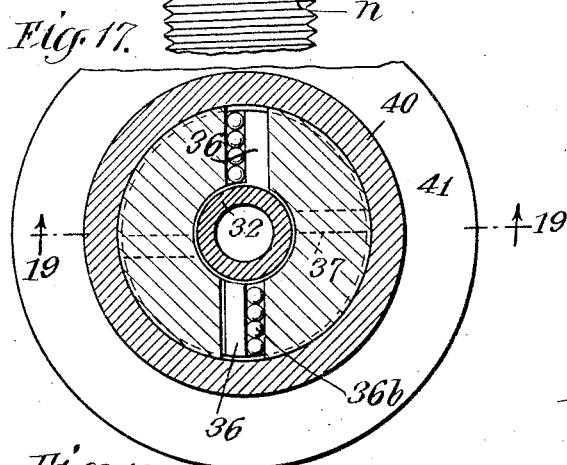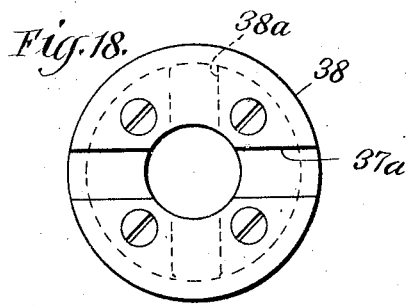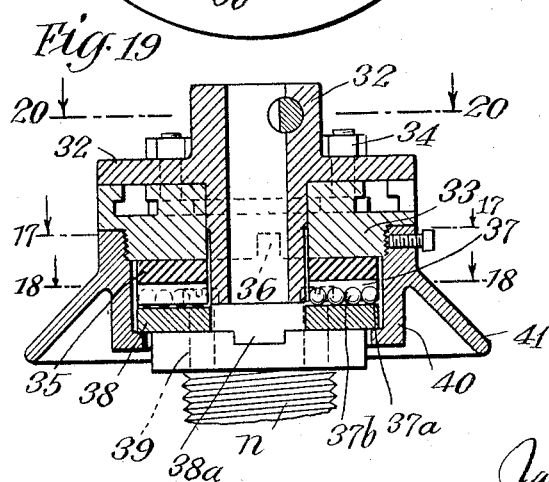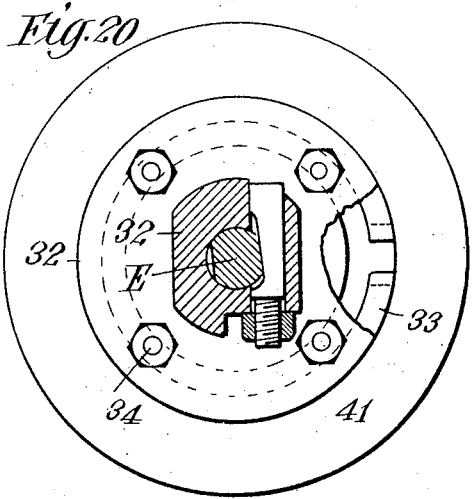

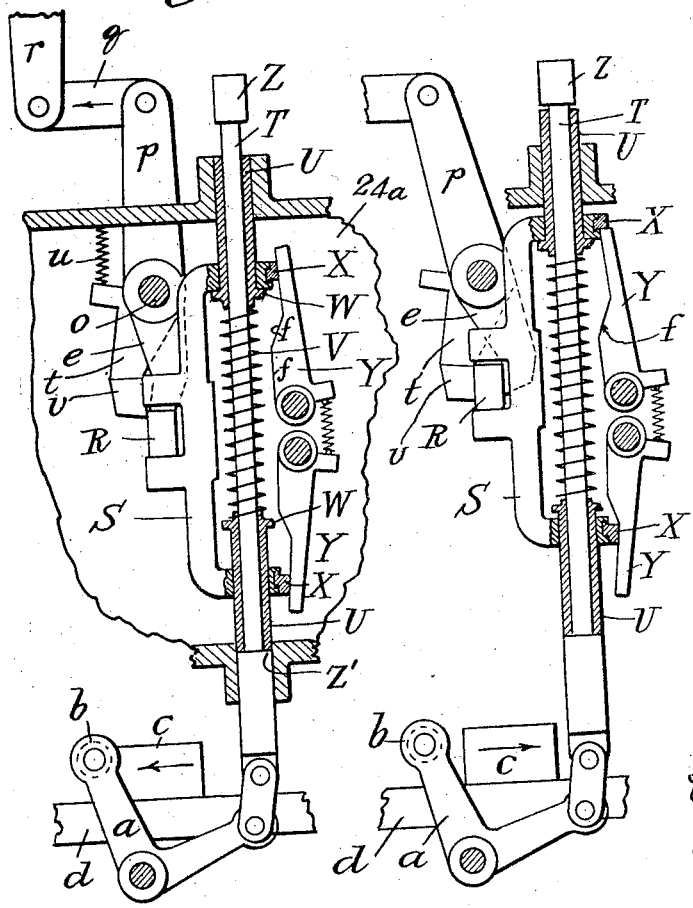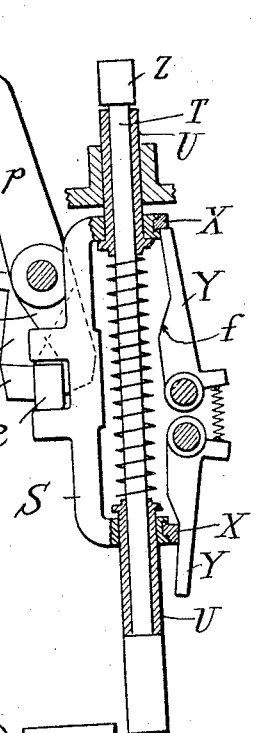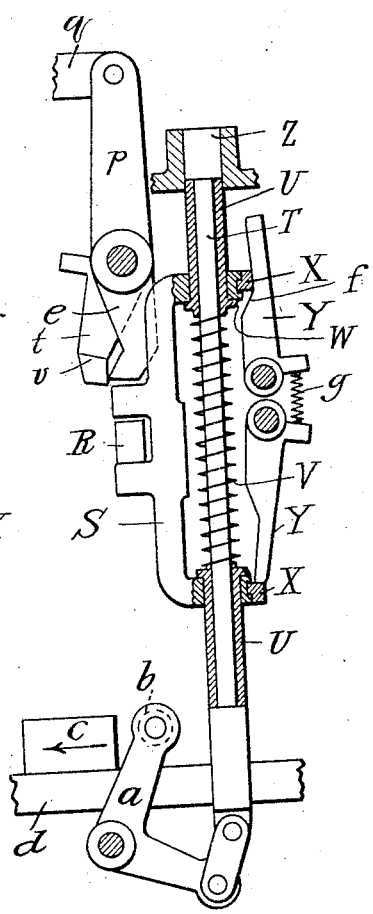

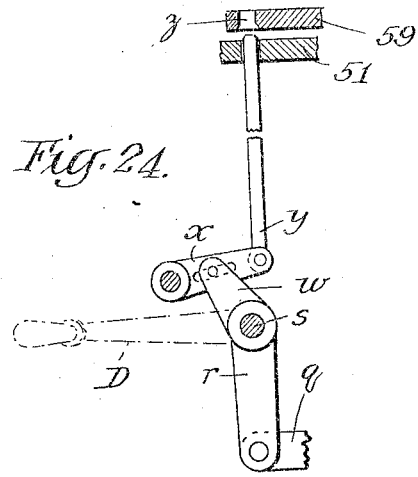
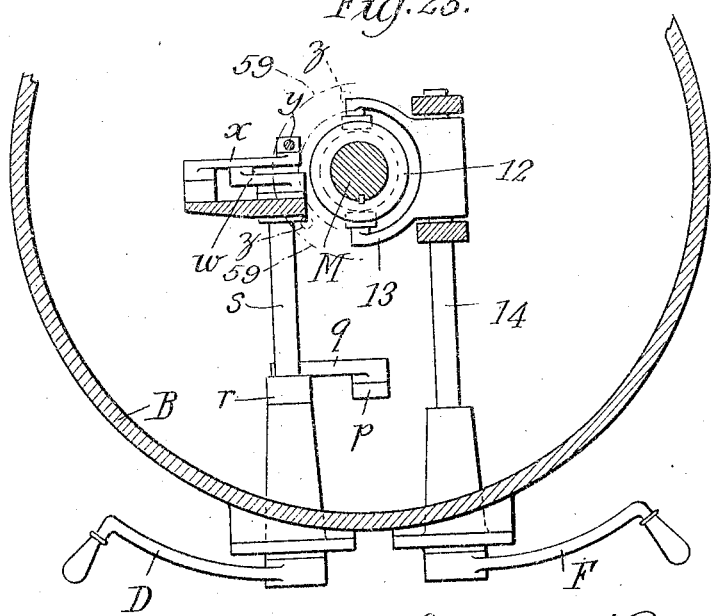

J. A. EDEN, Jr.
TAPPING MACHINE.
APPLICATION FILED MAR. 1, 1916.
1,236,414.
Patented Aug. 14, 1917
11 SHEETS—SHEET 11.
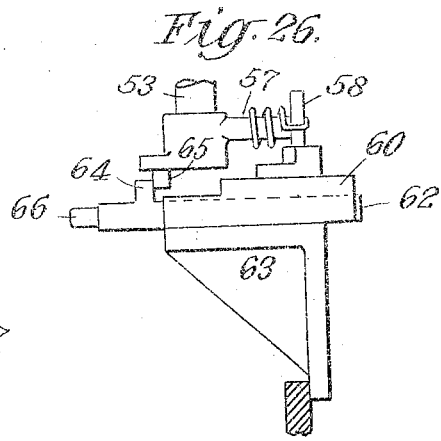
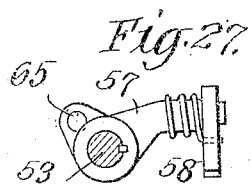
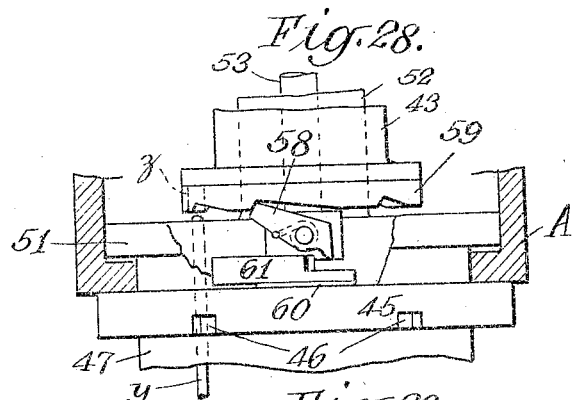
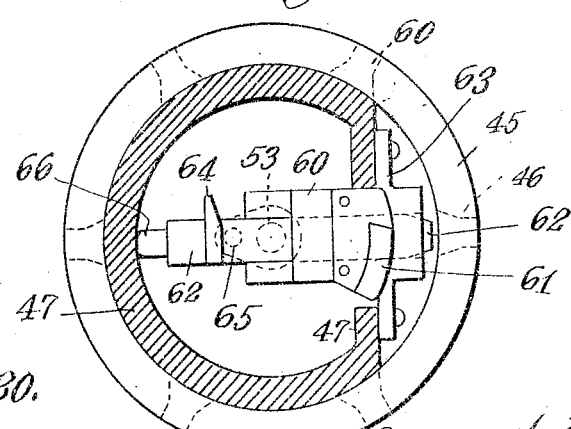
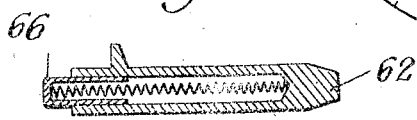
James A. Eden, Jr. INVENTOR
BY Anthony Haina ATTORNEY

UNITED STATES PATENT OFFICE.

JAMES A. EDEN, JR., OF SPRINGFIELD, MASSACHUSETTS, ASSIGNOR TO BAUCH MACHINE TOOL COMPANY, A CORPORATION OF MASSACHUSETTS.

TAPPING-MACHINE.

1,236,414.     Specification of Letters Patent.     Patented Aug. 14, 1917.

Application filed March 1, 1916. Serial No. 81,366.

*To all whom it may concern:*

Be it known that I, JAMES A. EDEN, Jr., a citizen of the United States, residing in Springfield, Massachusetts, have invented certain new and useful Improvements in Tapping-Machines, of which the following is a specification.

This invention provides a machine for cutting a fairly long thread by subjecting the work to the successive operations of a set of taps graduated so that each performs a partial cutting operation and the set of taps completes the thread; and the invention provides for a machine of this sort capable of a large output, of accurate work and of easy and safe control. Other features of improvement are referred to hereinafter in detail.

The accompanying drawings illustrate a machine embodying the invention.

Figure 1:
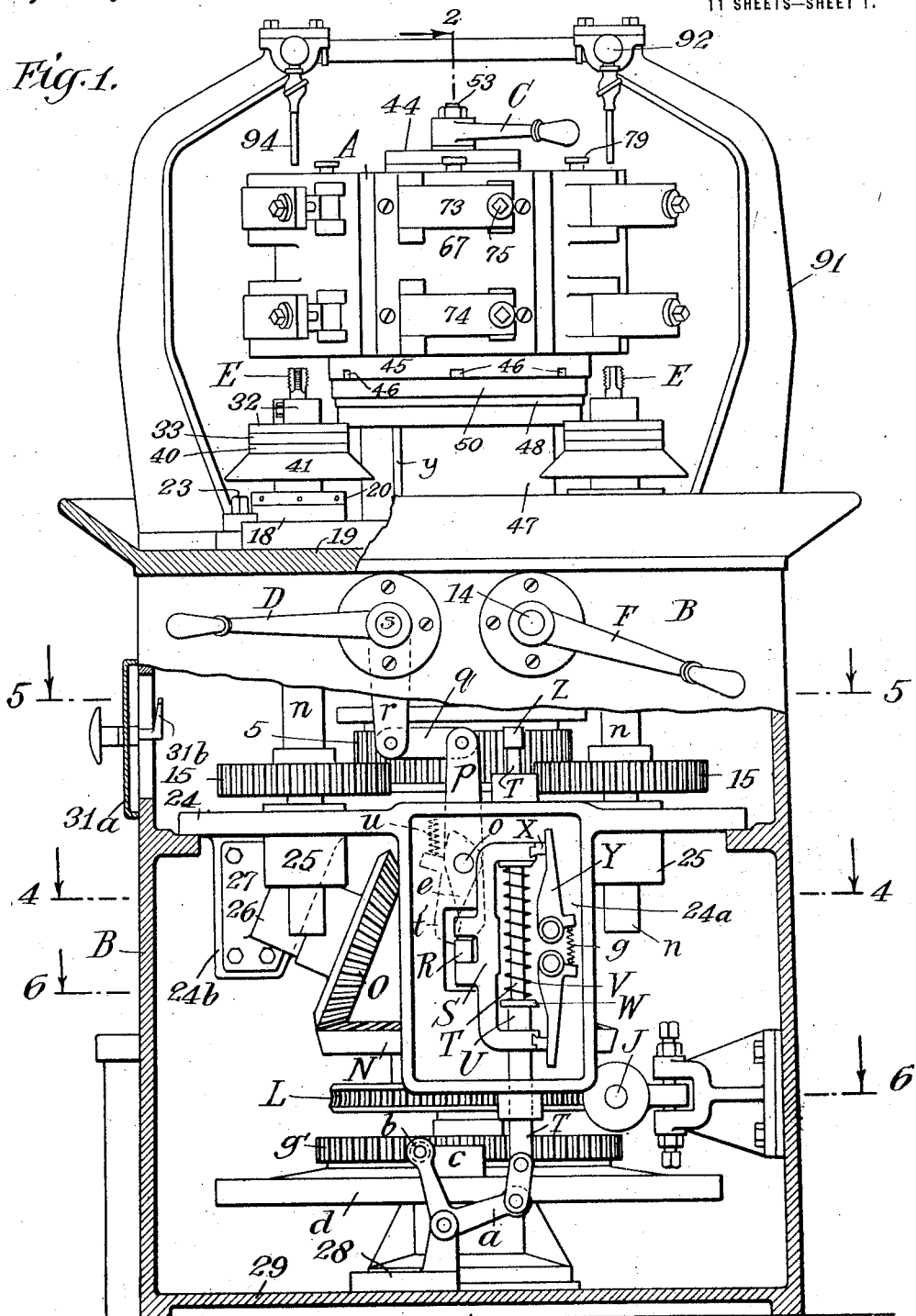
Figure 1 is a front elevation of practically the entire machine, a portion of the casing being broken away to show the mechanism within.
Figure 2:
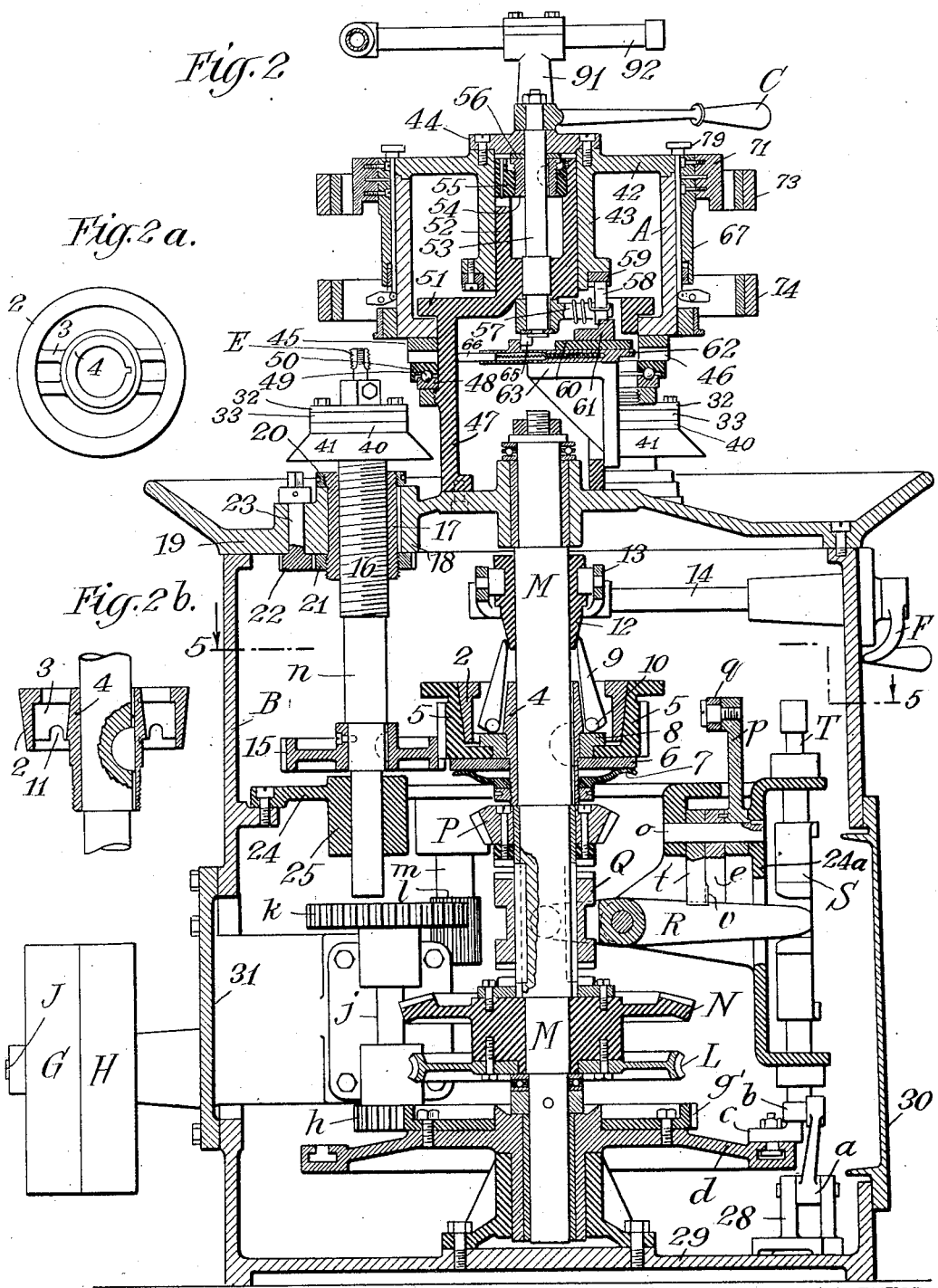
Fig. 2 is a vertical section on the line 2—2 of Figs. 1 and 3; the plane of view thereof being at right angles to that of Fig. 1.
Figure 3:
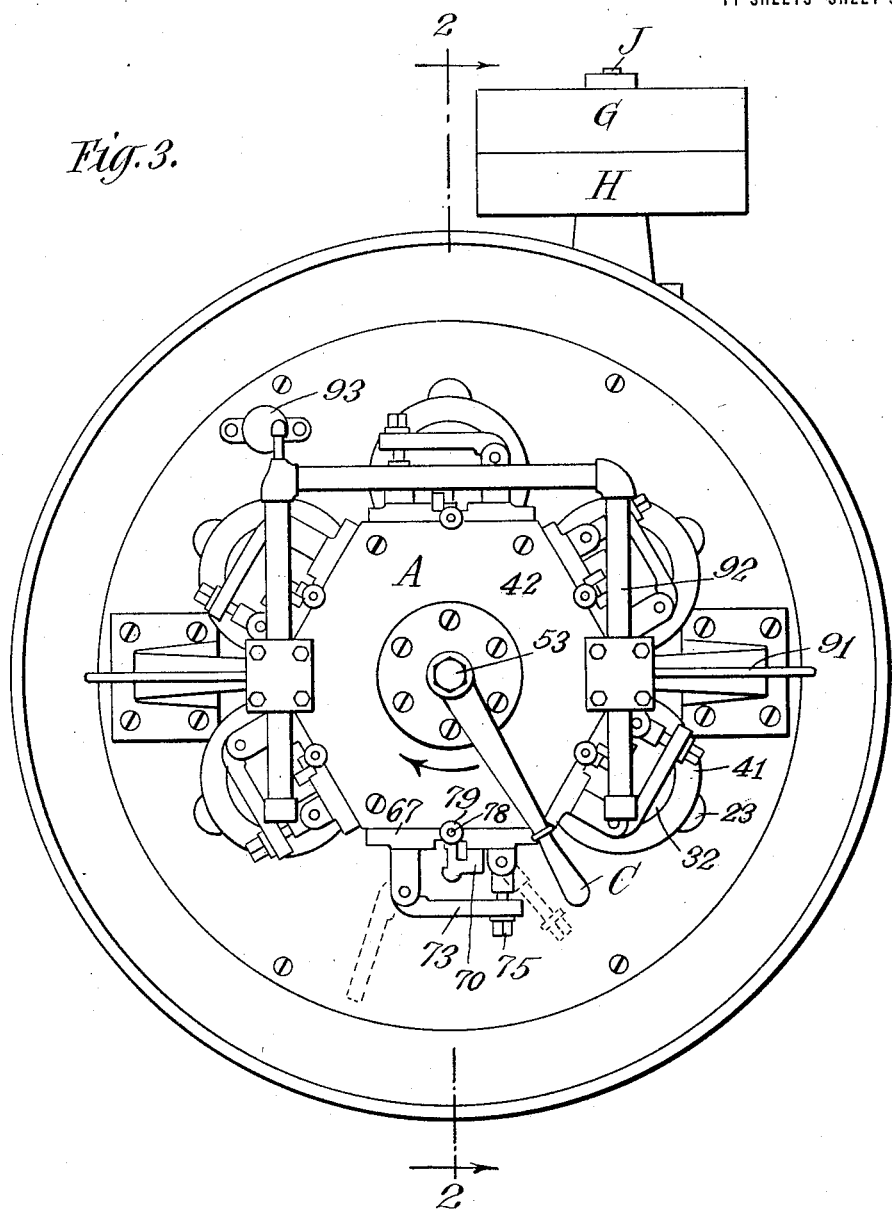
Figure 4:
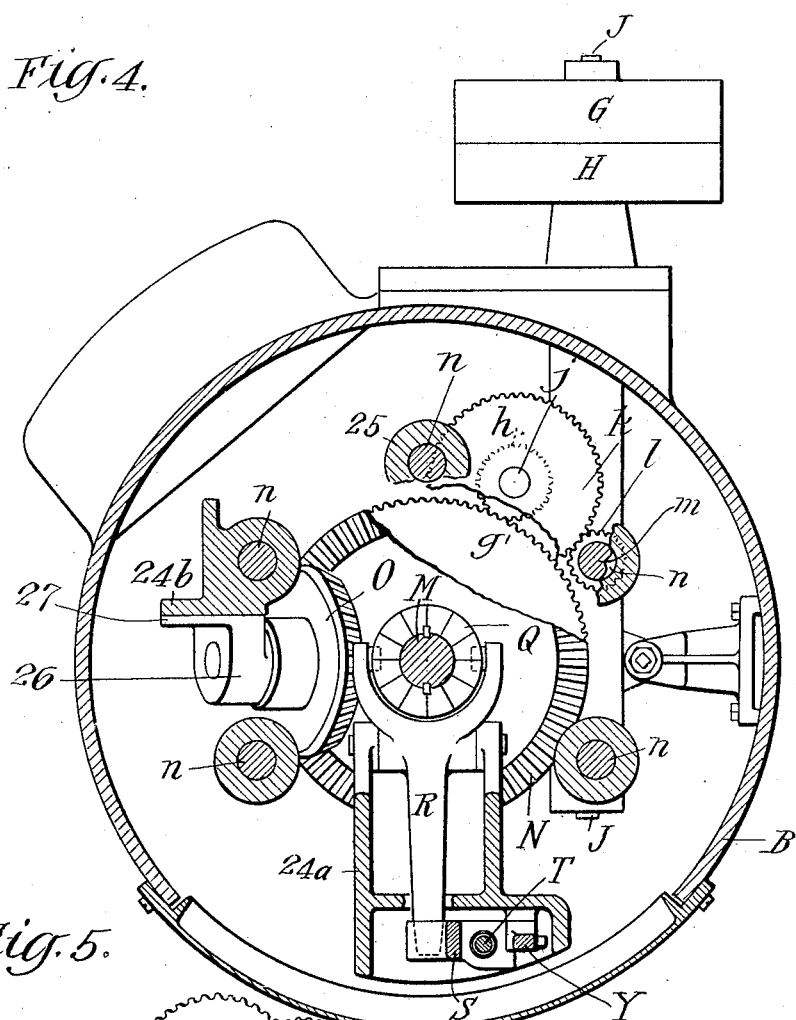
Figure 5:
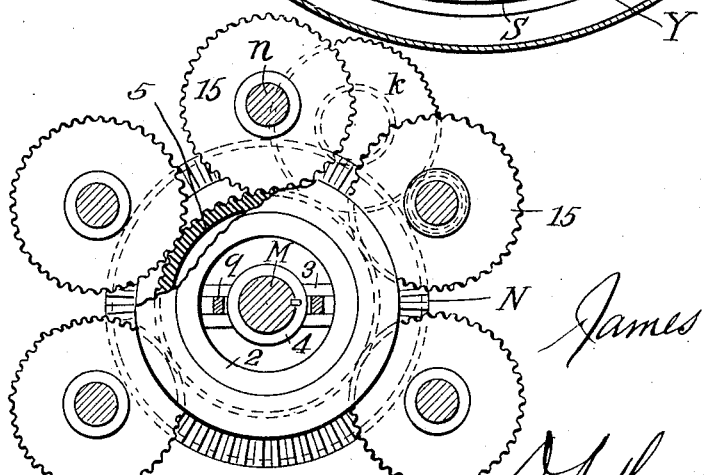

Figs. 2ᵃ and 2ᵇ are respectively a fragmentary plan and vertical section of a detail of Fig. 2;

Fig. 3 is a top plan view thereof;

Fig. 4 is a horizontal section on the line 4—4 of Fig. 1;

Fig. 5 is a horizontal section on the line 5—5 of Figs. 1 and 2;

Fig. 6 is a horizontal section on the line 6—6 of Fig. 1;

Fig. 7 is a front elevation of one of the work holders shown in place in the previous figures;

Figs. 8, 9 and 10 are sections on the correspondingly numbered lines of Fig. 7;

Fig. 11 is a front elevation of the work holder for a differently shaped work piece;

Fig. 12 is a section of the same on the line 12—12;

Figs. 13 and 14 are sections on the correspondingly numbered lines in Fig. 11;

Fig. 15 is an elevation of the upper end of one of the tap-carrying spindles with a tap holder thereon, the latter being partly broken away to show the connection;

Fig. 16 is an elevation, partly in section of the same parts, at right angles to the view shown in Fig. 15;

Fig. 17 is a horizontal section on the line 17—17 of Fig. 19;

Fig. 18 is a horizontal section on the line 18—18 of Fig. 19;

Fig. 19 is a vertical section on the line 19—19 of Fig. 17;

Fig. 20 is a horizontal section on the line 20—20 of Fig. 15 and Fig. 19;

Figs. 21, 22 and 23 are sectional views of the reversing slide and connected parts;

Fig. 24 is an elevation of a device for locking the starting lever;

Fig. 25 is a plan of the starting and clutch levers and their shafts and adjacent parts;

Fig. 26 is an enlarged side elevation of the lower end of the indexing shaft, and connected parts;

Fig. 27 is a plan of the same;

Fig. 28 is an end elevation of the indexing pawl and adjacent parts near the end of a stroke;

Fig. 29 is a plan of the turret latch and adjacent parts;

Fig. 30 is a section of a detail.

Referring to the embodiment of the invention illustrated, the work pieces are carried in holders on the faces of a hexagonal turret A at the top and the taps are carried on spindles which have their upper ends projecting out of a casing B which inclosed their lower portions and the operating mechanism therefor. Five spindles are located at stations corresponding to five faces of the turret, the front station being without a corresponding spindle. At this station the operator opens a holder, takes out the completely tapped work piece and inserts a new work piece. He then indexes the turret, advancing it one step, one-sixth of a revolution by means of an oscillating hand lever C. He then lifts a hand lever D which starts the operation of the spindles. The hand lever D being lifted and released the mechanism rotates and advances the several spindles and the taps E carried on the upper ends thereof, automatically reverses and withdraws the taps and automatically stops ready for a new operation as soon as it shall be again started by the lever D. During this advance and withdrawal of the taps the operator has time to take out a tapped piece of work at the feeding station and to supply a new piece, so that when the cycle of operations of the taps is completed he has only to index the turret one step by the hand lever C and then to lift the lever D, repeating as before. The first tap E performs a partial cutting of the thread, the second tap performs a further cutting, etc., the set of five taps completing the thread. As all the work pieces are simultaneously shifted to successively advanced positions in line with the successive spindles, and as all the spindles are simultaneously operated between successive shiftings of the work, the machine produces at each operation, that is at each indexing operation, a piece of work completely threaded by the successive tapping operations; so that the output of the machine is very great. The rate of operation is practically the fastest rate at which the work pieces can be removed from and introduced into a holder, the tapping operation being so subdivided that each of the five parts thereof takes only about the length of time required for the operator to withdraw a work piece and supply a new one, and the operation of the indexing and starting levers requiring only a very brief interval. During a tapping operation practically the only moving parts which are directly accessible are the taps themselves so that the operator can do his part rapidly with perfect safety, the power driven mechanism, excepting the taps alone, being entirely inclosed within the casing. The starting lever cannot be operated except after the turret has been indexed and the work is accurately centered, by reason of a lock hereinafter described. A safety lever F is provided by which the spindle-operating mechanism can be stopped at any time by disconnecting it from the driving power by means of a friction clutch, referred to hereinafter.

Power is taken from fast and loose pulleys G, H on a horizontal shaft J projecting from the lower part of the machine, the inner end of the shaft being provided with a worm K engaging a worm gear L (Figs. 1 and 6) mounted to rotate on a central shaft M. The worm gear L is fastened to the hub of a beveled gear N which through an inclined intermediate pinion O drives a smaller gear P (Figs. 2 and 4) rotatably mounted on the central shaft at a higher point. The lower gear N is used for giving the forward motion to the taps and the upper gear P for giving a reverse or backing out motion to the taps at an increased rate of speed. Both gears are fixed against longitudinal movement on the shaft and are free to rotate thereon. They have toothed hubs adapted alternately to engage teeth on the opposite ends of a clutch sleeve Q (Fig. 2) which is splined on the shaft and is moved up or down through a forked lever R. In the intermediate position shown both gears are disengaged from the shaft and there is no motion imparted to the taps. In the lower position of the clutch sleeve Q it engages the teeth on the upper end of the hub of the gear N and drives the shaft forward. In the upper position it engages the teeth on the lower end of the hub of the gear P and drives the shaft in the reverse direction at an increased speed.

The clutch lever R is operated by a "load and fire mechanism"; that is to say, a mechanism which accumulates power in a spring tending to throw the lever and then releases the power to secure a quick throw at an exact point. This clutch-operating mechanism is timed from one of the spindles so that the starting and stopping of the operation is determined by the position of the tap with relation to the work. The mechanism for operating the lever R is shown in the neutral position in Figs. 1 and 2 and in the detail view, Fig. 21; Figs. 22 and 23 showing the same in the highest and the lowest positions respectively. The end of the lever projects through a slot in a slide S through the upper and lower ends of which passes a plunger T which is moved up and down automatically by means hereinafter described. The plunger T carries bushings U between which is a spring V pressing said bushings away from each other. Each bushing U has a flange at its inner end, with a beveled nose W. The plunger and the bodies of the bushings pass freely through the end portions of the slide S, but the flanges cannot pass. They, therefore, strike against the end portions of the slide as they are raised or lowered by the movement of the plunger. In each of the ends of the slide there is a hardened catch piece X. Upper and lower reversing pawls Y are pressed inward by a spring against the catch pieces X. When the slide rises to its highest position, Fig. 22, the upper pawl Y catches under the corresponding catch piece X so as to hold the slide up. Similarly when the slide is drawn down to its lowest position, Fig. 22, the lower pawl Y catches the catch piece X and prevents the slide from rising. The plunger T slides through the bushings U and has collars or shoulders Z, Z' which serve to push down the upper bushing U when the plunger is forced down and to push up the lower bushing U when the plunger is forced upward. The lower end of the plunger T is connected to one arm of a lever $a$ pivoted on a fixed standard and carrying a pin $b$ which lies in the path of a reversing dog $c$. This dog is mounted on an oscillating disk $d$ which is driven from one of the tap-spindles so that the dog $c$ carried thereon is carried around in the direction of the arrow in Fig. 22 while the tap is cutting a thread, and in the direction of the arrow in Fig. 23 while the tap is being withdrawn. At the end of a movement of withdrawal the dog $c$ strikes the pin $b$ as in Fig. 21, throwing the plunger T up and pressing the spring V against the upper bushing U, which in turn forces up the slide S and the outer end of the lever R. The lever is limited in its upward movement, however, by a pawl e which normally stands in the position of Fig. 21 and prevents the slide S from moving up sufficiently to catch the block X on the end of the pawl Y. This is the intermediate position of the lever R and consequently of the clutch ring Q on the central shaft, so that in this position the rotation of the spindles is stopped. The parts remain in this position until the work pieces are advanced a further step, whereupon the lever e is shifted as in Fig. 22, allowing the spring V to force the slide S to its highest position, where it is held by the pawl Y engaging the upper block X. The clutch on the central shaft is thus thrown down and a forward rotation is imparted to the spindles. From one of the spindles the rotation is imparted to the disk d and to the dog c thereon, in the direction of the arrow, Fig. 22. This position of the parts is held until the disk d has made a complete rotation and the dog c strikes the opposite side of the pin b, which rotation is timed to correspond with the complete advancing movement of the spindles. Instead of a single reversing dog c, which has to swing through a complete circle before reversing the operation, a pair of such dogs can be mounted on the disk d at any desired angular distance apart, one serving to reverse the mechanism by striking the pin b on one side and the other serving to stop the mechanism by striking the pin b on the other side; in which case the disk d will oscillate through a fraction of a complete rotation corresponding to a distance between the two dogs.

The dog c striking the lever a shifts it to the position of Fig. 23, drawing down the plunger T. The shoulder Z strikes the upper bushing U and draws the latter down, first compressing the spring V against the lower bushing and then causing the beveled nose W of the upper bushing to strike against the cam face f of the upper pawl Y and throws the latter out against the resistance of the pawl spring g. The throwing out of the upper pawl Y releases the slide S, and the spring V throws the latter down to its lowest position, Fig. 23, where the lower block X is caught by its pawl Y, so that the slide S is held down. This movement lowers the outer end of the clutch-operating lever R so that the clutch ring on the central shaft is thrown to its uppermost position and the taps are rotated in the reverse or withdrawing direction.

This reversing movement of the tap-spindles is communicated to the disk d and dog c and the latter continues to rotate until it again strikes the opposite face of the pin b, bringing the parts to the position of Fig. 21 and stopping the tap-spindles. In this stopping operation the plunger T carries the lower bushing U upward sufficiently for the beveled nose W thereof to strike the lower pawl Y and release the latter so that the slide may move upward to the intermediate position where it is stopped by the striking of the lever R against the pawl e as above described.

The driving of the dog c from one of the spindles insures the exact timing of the quick action clutch shifting mechanism in accordance with the position of the tap so as to determine the extent of the cutting operation very accurately and to make it uniform in the successive work pieces turned out. The disk d has a T-slot (Figs. 2 and 6) in which the dog c is mounted adjustably, the disk being driven by means of a gear $g'$ mounted thereon engaging a pinion h (Figs. 2 and 4) mounted on a shaft j carrying a gear k driven by a pinion l on an extension m constituting the lower end of one of the spindles n (Figs. 4 and 5) which carry the taps.

The stop pawl e of the clutch lever is operated by hand. It rotates on a stud o and is pinned to a lever arm p which is connected by a link q connected to a depending arm r which is mounted on the shaft s of the hand lever D. When this lever is raised, the parts being in the neutral position, Fig. 21, the machine is started as above described, and at the end of an advancing operation of the spindles is automatically reversed and at the end of the reversing operation is stopped ready for a new start.

Ordinarily after starting, the operator will drop the lever D and the stop pawl e will fall against the right hand side of the raised outer portion of the clutch operating lever R (Fig. 22), so that the reversal of the clutch and the lowering of the outer end of the clutch lever will cause the stop pawl e to fall into operative position in vertical line above the lever R (Fig. 23). In case the starting lever is not dropped or pushed down by the operator a safety pawl is provided which will prevent restarting. The safety pawl t is pivoted loosely on the stud o and is pressed against the regular pawl e by means of a spring u. The safety pawl t has a slight lip v (Fig. 2) overlapping the edge of the main pawl e, and is slightly longer than the main pawl. When the main pawl is operative, as in Fig. 21, the safety pawl t by reason of its greater length bears against the side of the lever R. When the main pawl e, therefore, is pushed to the right as in Fig. 22 to release the lever the safety pawl t is held from interference with the rising of the lever. In any case where the safety pawl t has come into place above the clutch lever, the shifting of the main pawl e to its operative position will cause it to engage the lip v of the safety pawl and throw the latter out, (Fig. 23).

Means are provided for locking the starting lever except when the work pieces are properly alined with the taps. See Figs. 24 and 25. The shaft s of the starting lever D has at its inner end a crank w which carries a pin working in a slot in a lever x, the end of which raises and lowers a locking pin y as the lever D is raised to start a tapping operation or is lowered during such tapping operation. The pin y is adapted to enter openings z in a ratchet ring 59 (hereinafter referred to) on the base portion of the turret A which are so placed that they register with the pin y in turn when the several work pieces are in line with the spindles. If the turret is not in proper tapping position the lever D cannot be raised because the pin y will strike against the underside of the turret. When the turret is correctly indexed, however, and ready for a tapping operation, one of the holes z in the base thereof will register with the pin y and permit the raising of the hand lever.

The driving power is transmitted to the several spindles through a frictional connection so as to permit a slight slip when the machine is reversed or started, this frictional connection being in the form of a friction clutch which can be used for stopping the machine at any time without waiting for a cycle of the automatic forward drive, reverse and backing off operations. The spindle shaft M has keyed thereon an inner friction clutch ring shown in sectional view in Figs. 2ª and 2ᵇ, the outer portion 2 of which is connected by webs 3 with an inner sleeve 4 directly engaging the shaft. The outer face of this clutch ring is tapered and engages a corresponding internal face on a gear 5 mounted on a disk 6 which is pressed upward against a shoulder on the part 4 by spring fingers 7 of a spider screwed on the lower end of the portion 4 of the inner clutch ring and fixed by a set nut. A ring 8 is held up by the disk 6 also against a shoulder on the portion 4. Levers 9 bear at their lower cam-shaped ends on the ring 8 and are provided with pins 10 projecting sidewise into notches 11 in the lower edges of the webs 3 of the inner clutch ring. The upper ends of the lever arms 9 bear on a cone 12 splined on the central shaft and having an annular groove in which are engaged the pins of a clutch fork 13 on the inner end of the shaft 14 of the hand operated clutch lever F.

When it is desired to stop the machine the hand lever F is raised, forcing down the cone 12 and spreading the levers 9. Their lower ends bearing on the ring 8 cause a forcing downward of the ring 8 and gear 5 against the resistance of the spring fingers 7. This releases the tapered clutch faces. When the hand lever F is dropped the clutch faces are again forced into engagement with the spring fingers 7 and the machine operates as above described. This is a clutch of known design. Any other usual or suitable style of friction clutch may be used.

The tap-spindles n are arranged around the central shaft M as shown in Fig. 5 and carry pinions 15 all of which engage the central gear 5 and are driven thereby. The width of the toothed faces of the gear 5 and pinions 15, as well as of the pinion l for driving the clutch-operating dog, are made sufficient to allow for the vertical feed of the several tap-spindles while the gears and pinion remain in engagement.

Each spindle n has a lead screw 16 corresponding to the lead of the tap and passing through an internal lead nut 17. The lead nut 17 is threaded externally at both ends and is splined in a boss 18 formed in the top portion 19 of the casing which incloses the spindle-operating mechanism. The spanner lock nut 20 is threaded on the upper end of the lead nut. On the lower end is a lock nut 21 in the form of a gear driven by a pinion 22 on a shank 23 with a squared upper end for a wrench. By suitably manipulating these lock nuts 20 and 21 the lead nut, and with it the spindle n can be lifted to set the starting point of the operation at any desired height, so as to adjust the machine for different taps and different pieces of work and to adjust the height of each spindle relative to that of the others.

Within the inclosing casing B is an intermediate horizontal annular plate 24 supported on internal flanges of the casing B carrying bosses 25 to guide the lower ends of the tap-spindles. The plate 24 is formed with downwardly extending portions constituting a cast frame 24ª as shown at the right of Fig. 2 for supporting the pivot of the main clutch lever R, the spindle o of the stop pawls, the guide for the plunger T of the reversing mechanism and the pawls Y which hold the slide up or down. The inclined gear O which connects the forward and rear driving gears N and P is carried by a boss 26 (Figs. 1 and 4) at the side of a plate 27 which is bolted also to a downward projection 24ᵇ of the plate 24. The lever a by which the spring plunger is actuated is pivoted upon a bracket 28 bolted directly on the floor 29 of the casing. Removable cover-plates 30 and 31 are bolted on the casing at a point facing the reversing mechanism and at a point opposite thereto. A hand hole door 31ª (Fig. 1) provides access to the upper part of the mechanism, being fastened by a latch 31ᵇ operated by a knob from the outside.

Any usual or suitable oiling system may be provided, this being omitted from the drawings of the spindle-operating mechanism for the sake of clearness. The taps E have their shanks fastened by set nuts into holders 32 (Figs. 15 to 20) which are mounted on drivers 33 by means of T-bolts 34 with their heads in an annular slot in the driver, so that each tap can be individually rotated about its axis to bring it to its proper starting point rotatably. The driver 33 is connected to the spindle $n$ by means of an Oldham coupling comprising a central coupling ring 35 with ribs 36 on its upper face engaging grooves $36^a$ in the underside of the driving member 33 and ribs 37 on its lower face engaging corresponding grooves $37^a$ in the upper face of a disk 38 which has a tongue $38^a$ and groove engagement directly with the head of the spindle $n$ and which is fastened down on the spindle by means of bolts 39. The driving member 33, which constitutes the upper coupling ring, the intermediate coupling ring 35 and the lower coupling ring 38 are held together by a cage 40 having a flange fitting under the ring 38 and having an internal thread at its upper end engaging a similar thread on the ring 33. The cage 40 of each holder is provided with an apron 41 for shedding the oil onto the top of the lower casing, whence it is carried away by any usual or suitable means.

The ribs 36 and 37 of the middle coupling ring 35 lie in recesses of considerable width in the upper coupling ring 33 and the lower coupling ring 38, as shown best in Figs. 15 and 16 and in each such recess there is introduced a line of balls $36^b$ and $37^b$ respectively. There is a small amount of float, or lateral play between the several rings 33, 35 and 38, the rings 35 and 38 fitting loosely in the cage 40. This permits the taps to shift slightly in a horizontal direction so as to correct any slight error between the center line of the turret or the work-holding fixture and the center line of the tap-driving spindles $n$. The lines of balls $36^b$ and $37^b$ are on the work side of the tongues 36 and 37 respectively, that is on the side which is subjected to pressure in the forward rotation of the spindle, so as to permit the floating movement referred to without undue friction between the engaging driving faces of the successive rings.

A turret A and means for indexing and locking it are shown in Figs. 2 and 3 and in detail in Figs. 26, 27, 28 and 29. It comprises a hexagonal drum with an inward flange at its lower edge, having a cover 42 with a tubular center 43 and a top plate 44 fastened thereon. On the bottom flange is mounted an index ring 45 with locking notches 46 at six equidistant points of its circumference. A drum-supporting column is provided consisting of an enlarged lower portion 47 carrying a ball race 48 and a series of balls 49 on which rests an upper ball race 50 carried by the index ring 45, so as to provide a supporting bearing for the drum; the part 47 being mounted on the top plate 19 of the lower casing and having at its upper end a flange 51 overlying the flange on the lower end of the turret so as to hold the latter down, and having an upward tubular extension 52 within the tubular core 43 of the turret and about which the latter rotates. An indexing shaft 53 has its bearings in the part 52 of the column and in the top plate 44 of the turret and carries the indexing lever C.

In operation this indexing lever C is first shoved to the right, to the position shown in the drawings, and is then pulled around to the left of the operator, in the direction shown by the arrow, Fig. 3, until the turret locks in its next position. A threaded bushing 53 (Fig. 2) is keyed on the index shaft and works in a nut 55 fixed in the upper end of the supporting column 52. The bushing 54 bears upward, through a washer 56, on the underside of the top plate 44 of the turret, and a small amount of play is provided between this top plate and the upper ends of the column 52 and nut 55. When the lever C is thrust backward to the position of Fig. 2 the bushing 54 works downward in its nut and allows the turret to settle its weight on the balls 49. When the lever C is pulled forward the bushing 54 working in its nut 55 lifts the turret until, near the end of the stroke, the inside flange on the lower edge of the turret pulls up solidly against the flange 51 of the supporting column, so as to steady the turret during a tapping operation while easing an indexing movement by the hand lever. The vertical movement of the turret is very slight,—just enough to bring it up solidly against the flange when locked and to lower it onto the ball bearing to turn freely when released. The turning of the turret is accomplished by means of an arm 57 keyed on the lower end of the indexing shaft 53 and carrying on its end a spring pawl 58 pivoted on an axis extending lengthwise of the arm 57. The center 43 of the turret carries an annular ratchet 59 in the path of the upper end of the pawl 58; so that on the rearward movement of the indexing lever the pawl clicks over the ratchet, and on the forward movement the pawl engages the ratchet and turns the turret. Mounted on a fixed horizontal plate 60 is a trip 61 which lies in the path of the tail of the pawl 58 and is struck thereby near the end of the stroke of the indexing lever (Fig. 28) so as to withdraw the pawl 58 from engagement with the ratchet as soon as the turret has arrived at its correct position and has been locked therein, while permitting a continued forward movement of the indexing lever which, without advancing the turret angularly will lift its lower flange firmly against the flange 51 of the supporting column and steady the turret.

The latch comprises a bolt 62 carried on a bracket 63 and guided in a groove in the underside of the plate 60 which is fastened down on the bracket 63 and embraces the bolt 62. The rear end of the bolt projects out of the guide plate 60 and carries on its upper end a lug or cam 64 having an inclined face bearing against a crank pin 65 projecting from the lower end of the indexing shaft 53. The bolt is hollow and contains a coiled spring which tends to push it out, the rear end of the spring being inclosed in a hollow plunger 66 (Fig. 30) which bears against the opposite face of the portion 47 of the drum column 52.

When the indexing lever is thrown back the crank pin 65 is turned to the position of Fig. 29 and withdraws the bolt, so that on the forward movement of the lever the bolt will be held withdrawn at least until the notch 46 into which it projected has swung past its end. Shortly thereafter the position of the crank pin will be such as to permit the bolt to advance, its spring pressing it against the inside face of the indexing ring 45, until the next notch 46 comes into line, whereupon the bolt will spring forward and hold the ring 45 and turret in proper position for a new tapping operation.

On each of the six faces of the turret there is mounted a work holder. Such holders will be designed in accordance with the shape of the work pieces. In Figs. 7 to 10 (and in the assembled figures of the machine) I have shown a holder designed for a casing used in the breech mechanism of a rifle, and in Figs. 11 to 14 a holder for the bolt of a rifle. These are articles which have to have long threads accurately tapped so that a number of successive tapping operations are required, and the present machine is designed particularly for providing such a number of successive tapping operations so as to secure the greatest accuracy and at the same time to turn out the product rapidly.

Referring first to Figs. 7 to 10 inclusive the base plate 57 of the holder is bolted on the face of the turret. The upper portion of the base plate is formed with recesses 68 to receive projections on the work piece indicated in dotted lines at 69. A projecting block 70 is fastened on the upper part of the base plate with a depending extension 71 fitting into a recess in the top of the work piece. A block 72 is mounted on the lower end of the base plate with a recess shaped to fit the lower end of the work piece and with a flange which takes under such lower end and prevents the work piece from dropping. The work piece being adjusted by inserting its upper end into engagement with the projections and recesses provided and then lifting it and resting its lower end on the flange of the block 72, is clamped by means of top and bottom bars 73 and 74 each pivoted at one end to the base plate and fastened at the other end by a pivoted bolt 75 working in a notch in the end of the bar. To adjust the position of the work piece more accurately and to absolutely prevent any movement thereof in the holder a lever 76 is arranged to bear against the top face of the lower end of the work piece, this lever being pivoted at 77 and adjustable through a link 78 extending to the top of the base plate where it is provided with an adjusting nut 79. A holder of this sort, having been once shaped and adjusted to fit the work, can be quickly opened to take out a tapped work piece and supplied with a new piece which will be held very firmly therein.

The holder for bolts of rifle mechanism (Figs. 11 to 14) is designed on the same principle for holding the work piece rigidly and positively against vertical or lateral movement or rotary movement about the axis of the tap. The base plate 80, which is bolted on the face of the turret, is provided with blocks 81 having vertical grooves in their forward faces against which the circular portion of the bolt is clamped by means of a broad bar or plate 82 hinged at one edge and fastened by a pivoted bolt 83 entering a notch in the opposite edge. The lower end of the work piece rests on a flange 84 at the bottom of the base plate and is pressed down thereon by a hand screw 85 mounted in a bracket on the base plate and screwing down on the upper end of the work piece which is indicated at 86. The lower end of the work piece has a handle 87 which is utilized to clamp the piece against rotation from the holder by means of a hand screw 88 mounted in a bracket 89 and pressing the handle against an opposite bracket 90.

These work holders are designed to permit quick manipulation. As indicated in Fig. 3 the workman at the front of the machine has only to loosen the swinging bolts 75 and throw them to the right and then to swing the bars 73 and 74 to the left in order to take out a tapped work piece and introduce another. In using the holder of Fig. 11 it is only necessary to withdraw the bolt 83 and to loosen the clamping screw 88 and then to throw open the bar plate 82. The insertion of a new piece is accomplished with substantially the same facility.

Figs. 1, 2 and 3 indicate the oiling system for supplying oil to the work while the thread is being cut. A pair of brackets 91 carry an overhead pipe 92 which is supplied with oil from a pump through a pipe 93 (Fig. 3) and which is provided at intervals with small valved pipes 94 (Fig. 1) located above the work. Any other usual or suitable oil supply may be provided.

Though I have described with great particularity of detail a certain specific embodiment of my invention yet it is not to be understood therefrom that the invention is restricted to the particular machine described. Various modifications may be made in detail and in the arrangement of the parts and the machine may be used in part or in whole without departing from my invention as defined in the following claims.

What I claim is—

1. A tapping machine having a plurality of spindles adapted to carry a set of taps for successive operations on a piece of work, means for shifting a plurality of work pieces simultaneously to successively advanced positions in line with the successive spindles, mechanism for operating said tap-spindles and controlling means for said operating mechanism adapted to automatically reverse the same at the end of an advancing movement and to automatically stop the same at the end of a retracting movement.

2. A tapping machine having a plurality of spindles adapted to carry a set of taps for successive operations on a piece of work, means for shifting a plurality of work pieces simultaneously to successively advanced positions in line with the successive spindles, mechanism for operating said tap-spindles and controlling means for said operating mechanism adapted to automatically reverse the same at the end of an advancing movement and to automatically stop the same at the end of a retracting movement, and a number of work holders in excess of the number of spindles so as to provide a station between two of the taps for emptying and reloading the work holders.

3. A tapping machine having a plurality of spindles adapted to carry a set of taps for successive operations on a piece of work, manually operated means for shifting a plurality of work pieces simultaneously to successively advanced positions in line with the successive spindles, mechanism for operating said tap-spindles, and manually released controlling means for said operating mechanism adapted to start the same, to automatically reverse the same at the end of an advancing movement and to automatically stop the same at the end of a retracting movement.

4. A tapping machine having a plurality of spindles adapted to carry a set of taps for successive operations on a piece of work, means for shifting a plurality of work pieces simultaneously to successively advanced positions in line with the successive spindles, mechanism for operating said tap-spindles and controlling means for said operating mechanism adapted to automatically reverse the same at the end of an advancing movement and to automatically stop the same at the end of a retracting movement, said operating mechanism including a frictional connection to the spindles for permitting a slight slip in starting or reversing.

5. A tapping machine having a plurality of spindles adapted to carry a set of taps for successive operations on a piece of work, means for shifting a plurality of work pieces simultaneously to successively advanced positions in line with the successive spindles, mechanism for operating said tap-spindles and controlling means for said operating mechanism adapted to automatically reverse the same at the end of an advancing movement and to automatically stop the same at the end of a retracting movement, and a manually operable friction clutch between said operating mechanism and said spindles for permitting a slight slip in starting and reversing and for permitting the stopping of the spindles at any time.

6. A tapping machine having a plurality of spindles adapted to carry a set of taps for successive operations on a piece of work and connecting means from each spindle to its tap having a certain amount of float to permit the successive taps to accurately center themselves with the work.

7. A tapping machine having a plurality of spindles adapted to carry a set of taps for successive operations on a piece of work and connecting means from each spindle to its tap comprising rings having a rotation-transmitting engagement with each other and having a certain transverse play or float to permit the successive taps to center themselves accurately with the work.

8. A tapping machine having a plurality of spindles adapted to carry a set of taps for successive operations on a piece of work, each spindle having a lead screw thereon, and a lead nut engaging each of such lead screws, said lead nuts being axially adjustable.

9. A tapping machine having a plurality of spindles adapted to carry a set of taps for successive operations on a piece of work and means for rotatively adjusting each of said taps separately before their operation on the work.

10. A tapping machine having a plurality of spindles adapted to carry a set of taps for successive operations on a piece of work, means for adjusting each spindle in an axial direction toward and away from the work and means for rotatively adjusting each of said taps separately before their operation on the work.

11. A tapping machine having a plurality of spindles adapted to carry a set of taps for successive operations on a piece of work, a main shaft, gears on the several spindles driven from said main shaft, driving means for said shaft rotating in opposite directions, clutching means for clutching said driving means alternately to the shaft, a power accumulating and releasing clutch shifter for shifting said clutch quickly from one position to another, said clutch shifter comprising a slide, pawls for holding it in either of its extreme positions, a spring, means for compressing said spring to accumulate a pressure against the slide toward its opposite position and then withdrawing the holding pawl, and means for automatically stopping said slide in its movement toward a starting position.

12. A tapping machine having a plurality of spindles adapted to carry a set of taps for successive operations on a piece of work, a main shaft, gears on the several spindles driven from said main shaft, driving means for said shaft rotating in opposite directions, clutching means for clutching said driving means alternately to the shaft, a power accumulating and releasing clutch shifter for shifting said clutch quickly from one position to another, said clutch shifter comprising a slide, pawls for holding it in either of its extreme positions, a spring, means for compressing said spring to accumulate a pressure against the slide toward its opposite position and then withdrawing the holding pawl, a manually removable stop for automatically stopping said slide in its movement toward a starting position, and a safety stop for similarly stopping said slide, said safety stop being removable through said manually removable stop.

13. A tapping machine having a plurality of spindles adapted to carry a set of taps for successive operations on a piece of work, means for shifting a plurality of work pieces simultaneously to successively advanced positions in line with the successive spindles, and mechanism for advancing and retracting all said spindles simultaneously between successive shiftings of the work so as to produce at each such operation a piece of work completely threaded by the successive tapping operations thereon, a starting lever for said mechanism and means for locking said lever against operation except when said work pieces are properly alined with the taps.

14. A tapping machine having a plurality of spindles adapted to carry a set of taps for successive operations on a piece of work, means for shifting a plurality of work pieces simultaneously to successively advanced positions in line with the successive spindles, and mechanism for advancing and retracting all said spindles so as to produce at each such operation a piece of work completely threaded by the successive tapping operations thereon, said work-shifting means including a turret, an operating shaft therefor, a ratchet connection between said turret and shaft, and a latch for said turret operated by said shaft.

15. A tapping machine having a plurality of spindles adapted to carry a set of taps for successive operations on a piece of work, means for shifting a plurality of work pieces simultaneously to successively advanced positions in line with the successive spindles, and mechanism for advancing and retracting all said spindles so as to produce at each such operation a piece of work completely threaded by the successive tapping operations thereon, said work-shifting means including a turret, an operating shaft therefor, a ratchet connection between said turret and shaft, means for breaking said connection, an anti-friction bearing for said turret, and means for rendering said bearing operative at the beginning of a stroke of said shaft and during the engagement of said ratchet connection and for rendering said bearing inoperative by the continued movement of said shaft after the breaking of said ratchet connection.

16. A tapping machine having a plurality of spindles adapted to carry a set of taps for successive operations on a piece of work, a turret adapted to carry a plurality of work pieces and to be turned so as to shift them simultaneously to successively advanced positions in line with the successive spindles, mechanism for advancing and retracting all said spindles simultaneously between successive shiftings of the work so as to produce at each such operations a piece of work completely threaded by the successive tapping operation thereon, and hand-operated means for indexing said turret and controlling said spindle-operating mechanism.

17. A tapping machine having a plurality of spindles adapted to carry a set of taps for successive operations on a piece of work, a turret adapted to carry a plurality of work pieces and to be turned so as to shift them simultaneously to successively advanced positions in line with the successive spindles, mechanism for advancing and retracting all said spindles simultaneously between successive shiftings of the work so as to produce at each such operation a piece of work completely threaded by the successive tapping operations thereon, a hand lever for indexing said turret and controlling means for said spindle-operating mechanism adapted to automatically reverse the same at the end of an advancing movement.

18. A tapping machine having a plurality of spindles adapted to carry a set of taps for successive operations on a piece of work, a turret adapted to carry a plurality of work pieces and to be turned so as to shift them simultaneously to successively advanced positions in line with the successive spindles, mechanism for advancing and retracting all said spindles simultaneously between successive shiftings of the work so as to produce at each such operation a piece of work completely threaded by the successive tapping operations thereon, a hand lever for indexing said turret and controlling means for said spindle-operating mechanism adapted to automatically reverse the same at the end of an advancing movement and to stop the same at the end of a retracting movement.

19. A tapping machine having a plurality of spindles adapted to carry a set of taps for successive operations on a piece of work, a turret adapted to carry a plurality of work pieces and to be turned so as to shift them simultaneously to successively advanced positions in line with the successive spindles, mechanism for advancing and retracting all said spindles simultaneously between successive shiftings of the work so as to produce at each such operation a piece of work completely threaded by the successive tapping operations thereon, an oscillating lever, a ratchet and pawl for indexing said turret as said lever is oscillated, a ball bearing supporting said turret during the first part of the forward stroke of the lever, means for lifting the turret from said bearing and bringing it into frictional engagement with a fixed part of the machine during the last portion of a forward stroke of the lever and means for breaking said ratchet and pawl connection during the last part of such forward stroke.

20. A tapping machine having a plurality of spindles adapted to carry a set of taps for successive operations on a piece of work, a turret adapted to carry a plurality of work pieces and to be turned so as to shift them simultaneously to successively advanced positions in line with the successive spindles, mechanism for advancing and retracting all said spindles simultaneously between successive shiftings of the work so as to produce at each such operation a piece of work completely threaded by the sucessive tapping operations thereon, an oscillating lever, a ratchet and pawl for indexing said turret as said lever is oscillated, a ball bearing supporting said turret during the first part of the forward stroke of the lever, means for lifting the turret from said bearing and bringing it into frictional engagement with a fixed part of the machine during the last portion of a forward stroke of the lever, means for breaking said ratchet and pawl connection during the last part of such forward stroke, and a latch connected with said lever for stopping the movement of the turret when the work pieces are in line with the spindles, so as to hold the same properly indexed while permitting a continued movement of the lever to produce said frictional engagement of the turret with the fixed part of the machine.

In witness whereof, I have hereunto signed my name.

JAMES A. EDEN, Jr.

Copies of this patent may be obtained for five cents each, by addressing the "Commissioner of Patents. Washington, D. C."